US006617968B1

(12) United States Patent
Odisho et al.

(10) Patent No.: US 6,617,968 B1
(45) Date of Patent: Sep. 9, 2003

(54) CAPACITIVE OIL LEVEL SENSOR FOR VEHICULAR DRIVE AXLES

(75) Inventors: William Warda Odisho, Kalamazoo, MI (US); Daniel R. Coleman, Kalamazoo, MI (US); Jim Ziech, Kalamazoo, MI (US); Jim Ridge, Kalamazoo, MI (US); Steven Lagerquist, Independence, KS (US); Mark Walton, Independence, KS (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/694,256

(22) Filed: Oct. 24, 2000

(51) Int. Cl.[7] ................................................. B60Q 1/00
(52) U.S. Cl. .................... 340/450.3; 340/439; 340/438; 340/612; 340/618; 340/693.5
(58) Field of Search .............................. 340/450.3, 439, 340/618, 693.5, 612, 438

(56) References Cited

U.S. PATENT DOCUMENTS

| | | | |
|---|---|---|---|
| 2,377,275 A | | 5/1945 | Smith |
| 3,744,314 A | | 7/1973 | Lenny |
| 3,913,414 A | * | 10/1975 | Freiburger .................. 74/710.5 |
| 4,140,198 A | * | 2/1979 | Chamberlain ................. 180/75 |
| 4,506,258 A | * | 3/1985 | Charboneau et al. ........ 340/618 |
| 4,518,956 A | * | 5/1985 | Kitagawa et al. ............ 340/620 |
| 4,646,070 A | | 2/1987 | Yasuhara et al. |
| 4,745,893 A | * | 5/1988 | Atherton et al. ............. 123/196 |
| 4,806,847 A | | 2/1989 | Atherton et al. |
| 5,053,745 A | | 10/1991 | Sasaki et al. |
| 5,103,368 A | | 4/1992 | Hart |
| 5,103,672 A | | 4/1992 | Terry, Jr. et al. |
| 5,282,386 A | * | 2/1994 | Niemczyk et al. ........ 340/450.3 |
| 5,442,977 A | * | 8/1995 | Danjou et al. ................. 74/607 |
| 5,900,810 A | | 5/1999 | Park et al. |
| 5,929,754 A | * | 7/1999 | Park et al. ................ 340/450.3 |

* cited by examiner

*Primary Examiner*—Daniel J. Wu
*Assistant Examiner*—Hung Nguyen

(57) ABSTRACT

A novel arrangement of a capacitive oil level and temperature sensor specifically provided to be mounted to a drive axle housing of a motor vehicle, is disclosed. The sensor comprises an L-shaped hollow body allowing for a simple fit in current production axles. The L-shaped hollow housing of the oil level sensor comprises a pair of mutually perpendicular legs. A substantially vertically oriented first leg includes an oil level detecting capacitor and adapted to be at least partially immersed in an oil reservoir of the axle housing. An oil temperature detecting thermistor is also disposed within the sensor housing. A second leg is substantially horizontally extending from the axle housing and contains an electronic sensor circuitry electrically coupled to the oil level detecting capacitor and to the thermistor, and is adapted to generate oil level and temperature output signals. Furthermore, the second leg of the sensor body is provided with a threaded mounting surface suitable for screwing the sensor into a threaded opening in the drive axle housing and a hexagonal wrench-engaging surface facilitating the installation of the oil level sensor.

30 Claims, 5 Drawing Sheets

CAPACITIVE OIL LEVEL SENSOR FOR VEHICULAR DRIVE AXLES

BACKGROUND OF THE INVENTION

1. Field of the Invention

The present invention relates to oil level sensors, and more particularly to a capacitive oil level and temperature sensor for drive axle housings of motor vehicles.

2. Description of the Prior Art

Capacitive liquid level sensors are well known in the prior art. Typically, they use elongated capacitors immersed in the liquid, such as oil, and extended over the expected range of liquid level. These capacitors may be of various different types, such as concentric cylindrical tubes or spaced plates. It is generally known to use capacitive liquid level sensors in motor vehicles for measuring an oil level in an engine and transmission. However, capacitive sensors currently used in the motor vehicles, are not readily adaptable for measuring oil level in a drive axle housing, especially in the rigid drive axles of trucks, due to clearance limitations within the drive axle housing and few openings through which to apply the sensor. Thus, there is a need for a capacitive liquid level sensor specifically adapted to be mounted in the drive axle housing of the motor vehicles.

SUMMARY OF THE INVENTION

The present invention provides a motor vehicle drive axle housing including a capacitive liquid level sensor specifically adapted to be mounted in an drive axle housing of a motor vehicle. Normally, the drive axle housing includes an oil reservoir containing a predetermined amount of oil adapted to lubricate axle gearing and bearing assemblies. The capacitive oil level sensor in accordance with the present invention comprises an L-shaped hollow body allowing for a simple fit in current production drive axles. The L-shaped hollow body of the oil level sensor comprises a pair of mutually perpendicular legs. A substantially vertically oriented first leg includes an oil level detecting capacitor and adapted to be at least partially immersed in the oil reservoir. The oil level in the oil reservoir is determined as a function of electric capacitance of the sensor capacitor. The oil level sensor in accordance with the present invention may include a thermistor for measuring a temperature of the oil, also disposed in the sensor body. A second leg is substantially horizontally extending from the drive axle housing and contains an electronic sensor circuitry electrically coupled to the oil level detecting capacitor and the thermistor, and adapted to generate oil level and temperature output signals. Preferably, the electronic sensor circuitry includes a digital microcontroller. The electronic sensor circuitry may include a radio frequency (RF) transmitter to wirelessly transmit the oil level and temperature output signals.

Furthermore, the second leg of the sensor body is provided with a cylindrical, threaded mounting surface suitable for screwing the sensor into a threaded opening in the drive axle housing in order to lock and orient the sensor in its place, and a nut member facilitating the installation of the oil level sensor.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
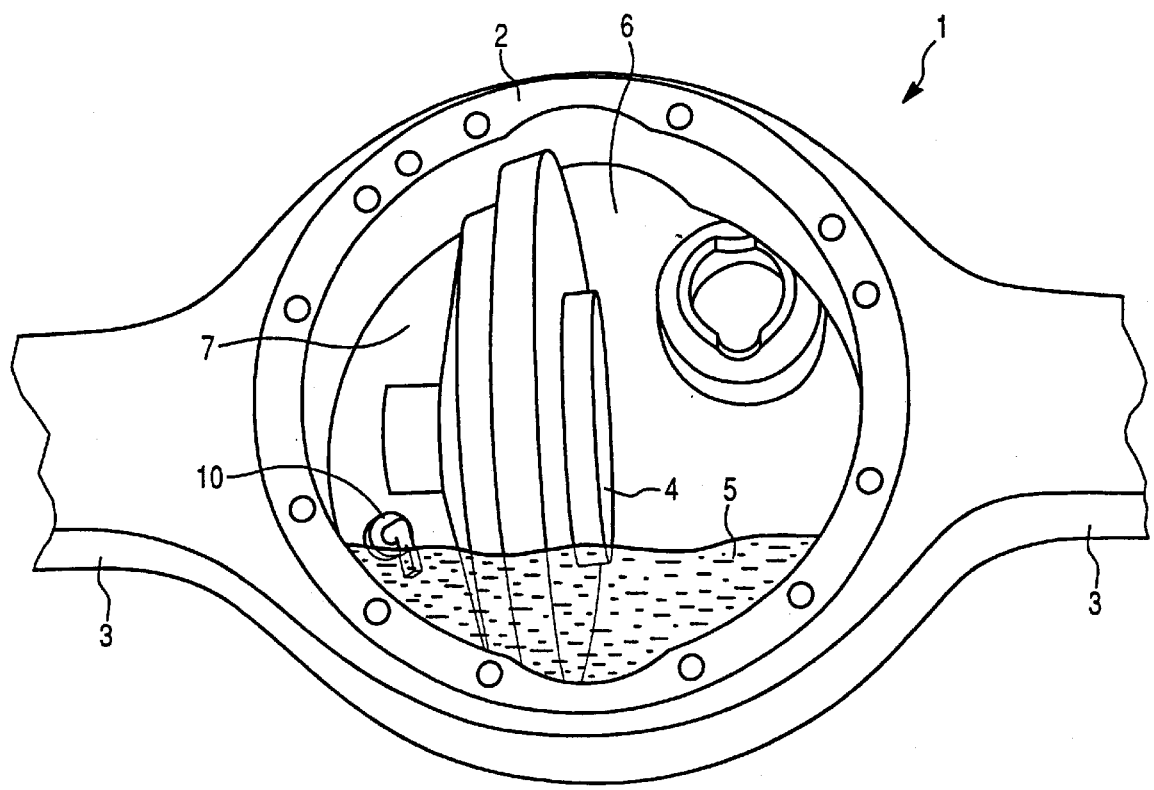
FIG. 1 is a perspective view of an oil level and temperature sensor mounted to a vehicular drive axle housing.

The present invention relates to a capacitive oil level and temperature sensor 10 specifically adapted to be mounted to a drive axle housing 1 of a motor vehicle (not shown), as illustrated in FIG. 1. The drive axle housing 1 includes an enlarged central portion 2 forming a compartment 6 for housing a ring gear 4 and a differential case (not shown) fastened to the ring gear 4, and a pair of opposite axle tubes 3 extending from the central portion 2. The central portion 2 is partially filled with lubricating oil for lubricating differential elements and axle bearings (not shown), thus forming an oil reservoir 5 in its lower part. A level of the lubricating oil in the oil reservoir 5 is an important vehicle maintenance parameter of a motor vehicle drive axle, and should be carefully monitored in accordance with the manufacturer's specification for proper maintenance of the motor vehicle. Failure to maintain appropriate oil level in the drive axle housing negatively affects durability and life span of the drive axle. The oil level and temperature sensor 10 for electronically measuring the oil level and temperature in the oil reservoir 5, is removably mounted to a sidewall 7 of the central portion 2 of the drive axle housing 1, and is at least partially immersed in the oil reservoir 5. Preferably, the oil level and temperature sensor 10 is installed in an oil fill plughole.

Figure 2:
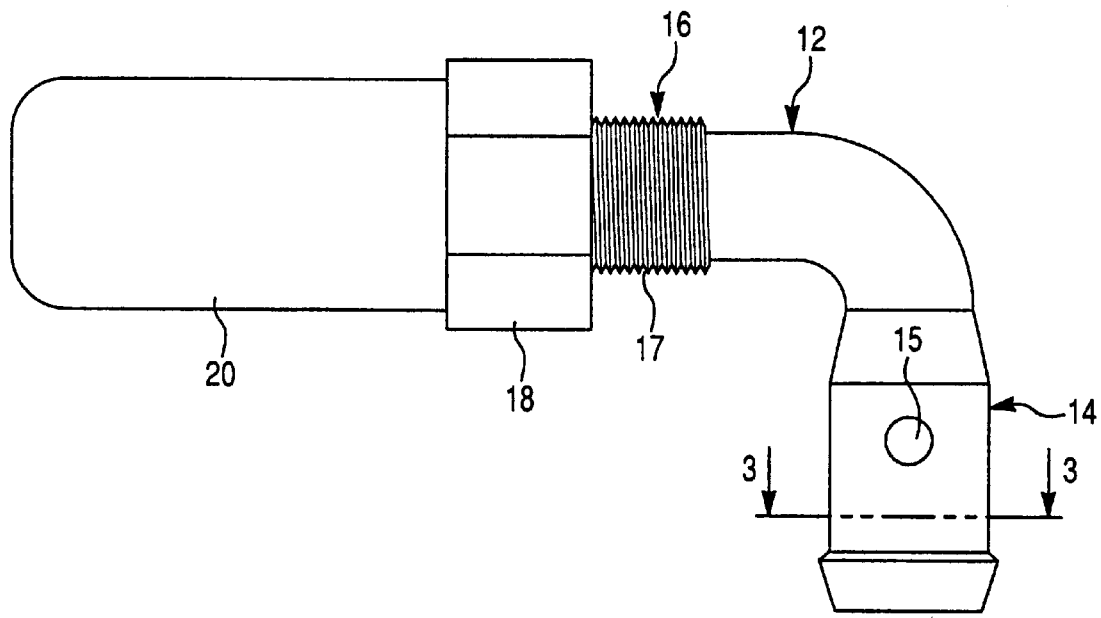
FIG. 2 is a side view of the oil level and temperature sensor in accordance with the first embodiment of the present invention.

Referring now to FIG. 2, the capacitive oil level and temperature sensor 10 in accordance with the first embodiment of the present invention is illustrated. The oil level and temperature sensor 10 comprises an L-shaped hollow housing 12 having a first leg 14 and a second leg 16 forming a substantially right angle with respect to each other. The first leg 14 houses an oil level detecting capacitor, and is at least partially immersed in the oil reservoir. The oil level in the oil reservoir is determined as a function of electric capacitance of the sensor capacitor. The first leg 14 of the housing 12 is open at its distal end that allows the axle lubricant oil to enter the sensor housing 12 so that the actual oil level can be measured, and is provided with at least one venting hole 15.

The second leg 16 of the sensor housing 12 extends from the drive axle housing 1 outside the compartment 3 substantially horizontally. The second leg 16 is provided with a cylindrical, threaded mounting surface 17 suitable for screwing the sensor into a threaded opening in the central portion 2 of the drive axle housing 1 in order to lock and orient the sensor in its place, and a wrench-engaging surface 18 facilitating the installation of the oil sensor. Preferably, the threaded mounting surface 17 and the wrench-engaging surface 18 are integrally formed with the L-shaped housing 12, and the wrench engaging surface 18 has hexagonal shape. It will be appreciated that any other appropriate shapes of the wrench engaging surface 18, such as triangular or square, are within the scope of the present invention. Provided at the distal end of the second leg 16 is a member 20 housing an electronic sensor circuitry 28.

Figure 3:
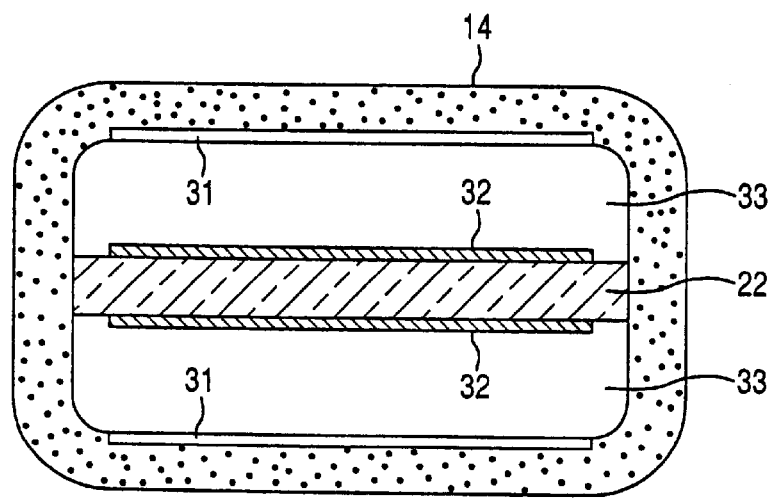
FIG. 3 is a cross sectional view through the oil level and temperature sensor taken along line 3—3 of FIG. 2.
Figure 4:
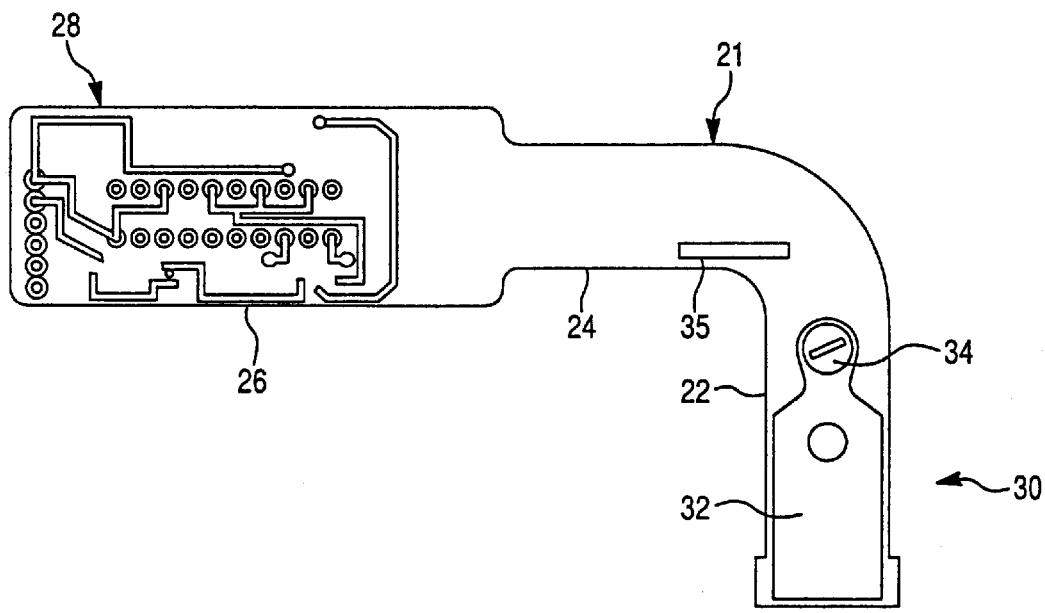
FIG. 4 is a side view of a printed circuit board with a plate electrode in accordance with the first embodiment of the present invention.

Various types of capacitors known in the prior art may be used in the present invention. FIGS. 3 and 4 illustrate the oil level sensor having a flat plate capacitor in accordance with the first preferred embodiment of the present invention, that comprises at least one pair of parallel plates mounted vertically in the oil reservoir to extend across the range of oil levels to be detected. The sensor 10 depicted in FIGS. 3 and 4, includes an L-shaped printed circuit (PC) board 21 having a first leg 22 and a second leg 24. The PC board is adapted to fit inside the sensor housing 12 wherein the first leg 22 of the PC board is disposed inside the first leg 14 of the sensor housing 12, and the second leg 24 of the PC board is disposed inside the second leg 16 of the sensor housing 12. An oil level detecting capacitor 30 is disposed at the distal end of the first leg 22 of the L-shaped PC board 21. The capacitor 30 includes an electrically conductive material 31 imbedded in at least one side of the first leg 22 of the PC board 21 and functions as a positive electrode, and at least one electrically conductive flat plate 32 functioning as a negative electrode, fastened to the first leg 22 of the PC board 21 facing the positive electrode 31, thus forming the capacitor 30. Preferably, the electrode plate 32 is riveted to the first leg 22 of the PC board 21 with a rivet 34; however, other appropriate fasteners well known in the prior art may be used. The plate 32 functions as a negative electrode. Alternatively, several electrode plates may be employed in order to increase the capacitive effect. Preferably, a pair of positive and a pair of negative electrodes is employed, as shown in FIGS. 3 and 4. A space between the electrode plates 31 and 32 within the first leg 14 of the sensor housing 12 forms a dielectric cavity 33 and is at least partially filled with the oil from the distal end of the first leg 14 of the sensor housing 12. The holes 15 located preferably on both sides of the first leg 14 of the sensor housing 12, are provided for venting air trapped inside the dielectric cavity 33 as the oil level varies.

As is well known in the prior art, the oil level sensor 10 measures the difference between the dielectric constant of air, which is approximately 1.0, and the lubricant oil, which is more than 2.0. The variation in the dielectric constant can be used to measure the oil level in the oil reservoir. As the oil level in the dielectric cavity 33 decreases, the average dielectric constant of the sensor also decreases substantially linearly. Thus, the sensor capacitance is a measure of the oil level in the drive axle housing. To increase the capacitive effect, several pairs of electrodes may be used.

Figure 6:
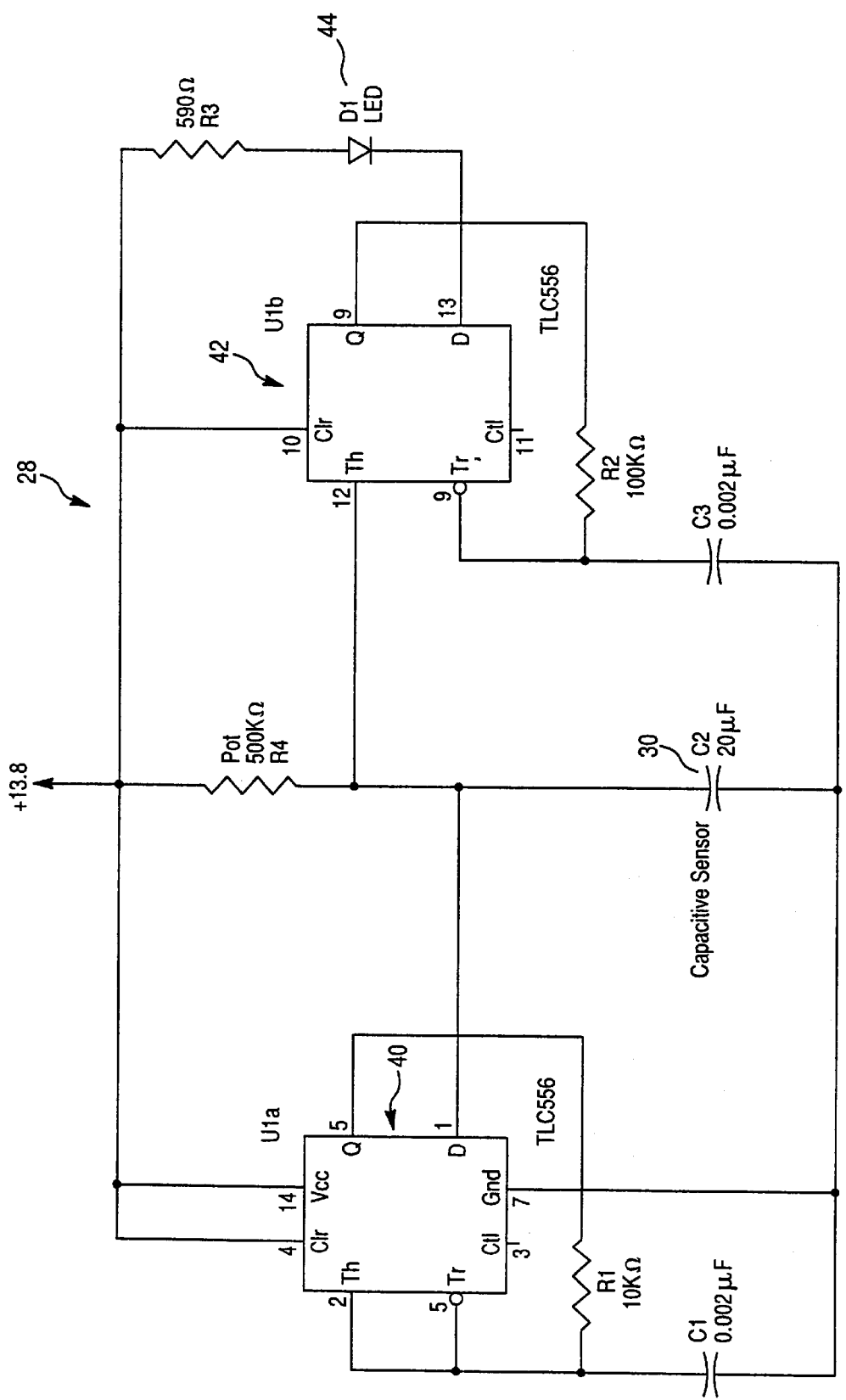
FIG. 6 is a schematic diagram of an electronic sensor circuitry for the oil level sensor.

As illustrated in FIG. 4, the distal end of the second leg 24 of the PC board 21 is provided with an integral circuit board segment 26. The circuit board segment 26 is adapted to support the electronic sensor circuitry 28 electrically coupled to the oil level detecting capacitor and the thermistor, and adapted to generate an oil level output signal. An exemplary embodiment of the electronic sensor circuitry 28 is illustrated in FIG. 6. Numeral 40 depicts a square-wave oscillator U1a at approximately 36 KHz, and numeral 42 depicts a pulse generator U1b. In operation, during the negative output of the square-wave oscillator 40, the capacitor 30 (C2) is discharged. Correspondingly, during the positive output of the square-wave oscillator 40, the capacitor 30 is charged towards 12 volts with a time constant 15 $\mu$s. When the oil level falls below a set point (approximately one inch below a fill level, as specified by an axle manufacturer), a peak voltage at the capacitor 30 rises until the pulse generator 42 produces a train of interrupt pulses at about 3.6 KHz as long as the oil level is below the set point, and turns a signal light, such as light emitting diode (LED) 44 on, thus warning a vehicle operator of a dangerously low oil level in the drive axle housing. It will be appreciated that any other appropriate electronic sensor circuitry well known in the art, may be employed without departing from the scope of the present invention.

The electronic sensor circuitry 28 may include a microcontroller (not shown) allowing a factory calibration and learning capability, and a wireless transmitter, such as radio frequency (RF) transmitter (not shown) adapted to transmit a signal representing the oil level to a remote oil level display unit (not shown) usually mounted to an instrument panel (not shown) of the motor vehicle. Alternatively, the electronic sensor circuitry 28 is connected to the oil level display unit through electric wires (not shown).

The sensor 10 in accordance with the present invention may include a means for measuring a temperature of the oil in the oil reservoir 5, preferably in the form of a thermistor 35 secured to the PC board 21, as illustrated in the FIG. 4. In this case, the electronic sensor circuitry 28 is electrically coupled to the thermistor 35, and is adapted to generate an oil temperature output signal in addition to the oil level output signal. It will be appreciated that any other appropriate means for measuring the oil temperature well known in the prior art, such as thermocouple, will be within the scope of the present invention.

Figure 5:
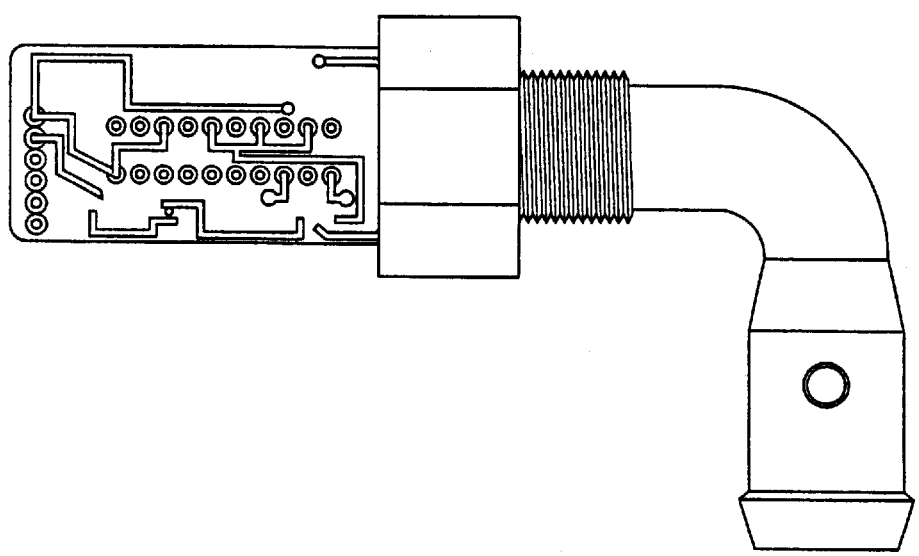
FIG. 5 is a side view of a printed circuit board disposed in an oil level sensor housing in accordance with the first embodiment of the present invention.

In the first exemplary embodiment of the present invention, the sensor housing 12 is made of plastic material, such as glass filled nylon, by molding thereof over the first and second legs 22 and 24, respectively, of the PC board 21 and the sensing unit 32, thus forming the sensor housing 12 integrally with the threaded mounting surface 17 and the nut member 18, as illustrated in FIG. 5. Then, the circuit board 26 supporting the electronic sensor circuitry 28 is encapsulated, for example, in a layer of epoxy material, forming the member 20, as illustrated in FIG. 2.

Furthermore, the second leg 16 of the sensor housing 12 is provided with an embossed image of an arrow (not shown) adapted to indicate the proper orientation of the oil level sensor 10 during the installation thereof in the drive axle housing 1. This will verify that the first leg 14 of the sensor housing 12 is properly oriented and immersed in the oil reservoir.

Figure 7:
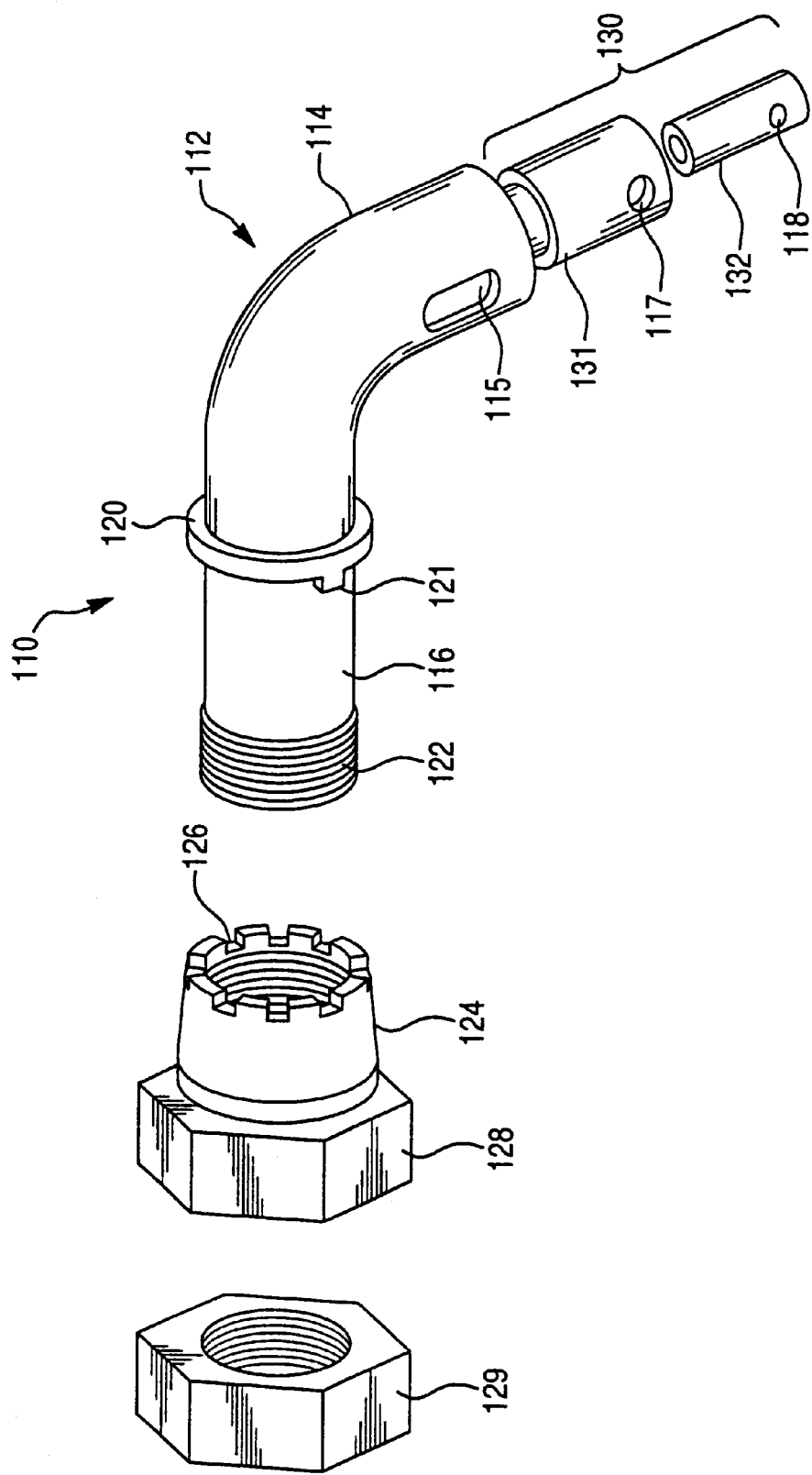
FIG. 7 is a perspective view of the oil level and temperature sensor in accordance with the second embodiment of the present invention.

FIG. 7 illustrates of an oil level sensor 110 in accordance with a second exemplary embodiment of the present invention. To simplify the description, all oil level sensor elements similar to those of sensor 10 are designated by numerals 100 higher.

The oil level sensor 110 comprises an L-shaped hollow tubular housing 112 having a first leg 114 and a second leg 116 forming a substantially right angle with respect to each other. The first leg 114 houses an oil level detecting capacitor, and is adapted to be at least partially immersed in the oil reservoir. The first leg 114 is open at its distal end that allows the axle lubricant oil to enter the sensor housing 112 so that the actual oil level can be measured, and is provided with at least one venting hole 115. The second leg 116 of the sensor housing 12 extends from the central portion 2 of the drive axle housing 1 outside the compartment 6 substantially horizontally. The second leg 116 is provided with a means for mounting the oil level sensor to the drive axle housing. Preferably, it includes a threaded portion 122 formed at the distal end of the second leg 116, an annular flange 120 fixed to the second leg 116 and preferably integral therewith, a threaded body 124 provided with a plurality of notches 126 formed at one end thereof, and a hexagonal wrench engaging surface 128 provided at the other end thereof, and a lock nut 129. The flange 120 is formed with at least one projection 121 engaging the appropriate notch 126 on the thread body 124 in order to properly position and lock the oil level sensor housing 112 in place.

The oil level sensor 110 in accordance with the second embodiment of the present invention, shown in FIG. 7, is provided with an oil level detecting capacitor 130 of a tubular type, including at least a pair of tubular concentric electrodes 131 and 132 concentrically disposed within the first tubular leg 114. In order to increase the capacitive effect, several concentric electrodes may be employed.

As illustrated in FIG. 7, the tubular electrodes 131 and 132 are each provided with one or more venting holes 117 and 118. The holes 115, 117 and 118 are provided for venting air trapped inside the dielectric cavity 33 as the oil level varies.

Therefore, the oil level sensor in accordance with the present invention represents a novel arrangement of the capacitive liquid level sensor specifically adapted to be mounted in the drive axle housing of the motor vehicles.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A drive axle housing of a motor vehicle, said axle housing comprising:
   an enlarged central portion housing a differential assembly; said central portion forming an oil reservoir containing a certain amount of lubricating oil;
   a pair of opposite axle tubes extending from said central portion; and
   a capacitive oil level sensor mounted to said central portion of said drive axle housing and provided for measuring an oil level in said oil reservoir, wherein said oil level sensor is partially immersed in said oil reservoir, and wherein said capacitive oil level sensor comprising:
      an L-shaped housing having a first leg at least partially immersed in said oil reservoir and a second leg disposed substantially perpendicular from said first leg and extending outside said drive axle housing substantially horizontally, said first leg houses an oil level detecting capacitor at least partially is immersed in said oil reservoir to detect said oil level.

2. The drive axle housing as defined in claim 1, wherein said capacitive oil level sensor further comprising an oil temperature sensor for measuring an oil temperature in said oil reservoir.

3. The drive axle housing as defined in claim 1, wherein said capacitive oil level sensor further comprising:
   a threaded mounting surface formed at said second leg of said sensor housing provided for threading said sensor into a threaded opening in said drive axle housing, and
   a wrench engaging surface secured to said second leg and adapted for mounting said sensor to said drive axle housing.

4. The drive axle housing as defined in claim 3, wherein said threaded opening in said drive axle housing is a fill plughole.

5. The drive axle housing as defined in claim 1, wherein said oil level detecting capacitor includes at least a pair of flat electrode plates.

6. The drive axle housing as defined in claim 1, wherein said oil level detecting capacitor includes at least a pair of tubular electrodes.

7. The drive axle housing as defined in claim 1, wherein said capacitive oil level sensor further comprising an oil temperature sensor for measuring an oil temperature in said oil reservoir, said oil temperature sensor disposed in said sensor housing.

8. The drive axle housing as defined in claim 7, wherein said oil temperature sensor includes a thermistor.

9. The drive axle housing as defined in claim 7, wherein said capacitive oil level sensor further comprising an electronic sensor circuitry electrically coupled to said oil level detecting capacitor and said oil temperature sensor, and adapted to generate an electric signal proportional to said level of said oil in said drive axle housing and an electric signal proportional to said oil temperature in said oil reservoir.

10. The drive axle housing as defined in claim 9, wherein said electronic sensor circuitry includes an electromagnetic wave transmitter suitable for transmitting said electrical signal to a remote oil level display unit.

11. The drive axle housing as defined in claim 1, wherein said capacitive oil level sensor further comprising an electronic sensor circuitry electrically coupled to said oil level detecting capacitor and adapted to generate an electric signal proportional to said level of said oil in said drive axle housing.

12. The drive axle housing as defined in claim 11, wherein said electronic sensor circuitry includes an electromagnetic wave transmitter suitable for transmitting said electrical signal to a remote oil level display unit.

13. The drive axle housing as defined in claim 1, wherein said capacitive oil level sensor comprising:
   an L-shaped housing having a first leg adapted at least partially immersed in said oil reservoir and a second leg disposed substantially perpendicular from said first leg and extending outside said drive axle housing substantially horizontally;
   an L-shaped flat printed circuit board having a first leg disposed in said first leg of said sensor housing and a second leg disposed in said second leg of said sensor housing;
   at least one first electrode plate fixed inside said first leg of said sensor housing;

at least one second electrode plate attached to said first leg of said printed circuit board opposite to said first electrode plate, wherein said first and second electrode plates forming a capacitor, a capacitance of said capacitor is a function of said level of said oil in which said capacitor is immersed;

a threaded mounting surface formed at said second leg of said sensor housing provided for threading said sensor into a threaded fill plughole in said drive axle housing;

a wrench engaging surface provided on said second leg and adapted for mounting said sensor to said drive axle housing;

a thermistor for measuring an oil temperature in said oil reservoir, said thermistor mounted to said printed circuit board; and an electronic sensor circuitry electrically coupled to said oil level detecting capacitor and said thermistor, and adapted to generate an electric signal proportional to said oil level in said drive axle housing and an electric signal proportional to said oil temperature in said oil reservoir, wherein said electronic sensor circuitry is supported on said second leg of said printed circuit board.

14. A capacitive oil level sensor mounted to an drive axle housing of a motor vehicle, said drive axle housing having an oil reservoir containing a certain amount of lubricating oil, said capacitive oil level sensor provided to measure an oil level in said reservoir, said sensor comprising:

an L-shaped housing having a first leg adapted partially immersed in said oil reservoir and a second leg disposed substantially perpendicular from said first leg and extending outside said drive axle housing substantially horizontally, wherein said first leg houses an oil level detecting capacitor is at least partially immersed in said oil reservoir to detect said oil level.

15. The capacitive oil level sensor as defined in claim 14, further comprising:

a threaded mounting surface provided at said second leg and suitable for threading said sensor into a threaded opening in said drive axle housing, and a wrench engaging surface secured to said second leg and adapted for mounting said sensor to said drive axle housing.

16. The capacitive oil level sensor as defined in claim 15, wherein said threaded opening in said drive axle housing is a fill plughole.

17. The capacitive oil level sensor as defined in claim 14, wherein said oil level detecting capacitor includes at least a pair of flat electrode plates.

18. The capacitive oil level sensor as defined in claim 14, wherein said oil level detecting capacitor includes at least a pair of tubular electrodes.

19. The capacitive oil level sensor as defined in claim 14, further comprising an oil temperature sensor disposed in said sensor housing.

20. The capacitive oil level sensor as defined in claim 19, wherein said oil temperature sensor includes a thermistor.

21. The capacitive oil level sensor as defined in claim 19, wherein said capacitive oil level sensor further comprising an electronic sensor circuitry electrically coupled to said oil level detecting capacitor and said oil temperature sensor, and is adapted to generate an electric signal proportional to said oil level in said drive axle housing and an electric signal proportional to said oil temperature in said oil reservoir.

22. The capacitive oil level sensor as defined in claim 21, wherein said electronic sensor circuitry includes an electromagnetic wave transmitter suitable for transmitting said electrical signal to a remote oil level display unit.

23. The capacitive oil level sensor as defined in claim 14, further comprising an electronic sensor circuitry electrically coupled to said oil level detecting capacitor and adapted to generate an electric signal proportional to said level of said oil in said drive axle housing.

24. The capacitive oil level sensor as defined in claim 23, wherein said electronic sensor circuitry includes an electromagnetic wave transmitter suitable for transmitting said electrical signal to a remote oil level display unit.

25. A capacitive oil level and temperature sensor mounted to a drive axle housing of a motor vehicle, said drive axle housing having an oil reservoir containing a certain amount of lubricating oil, said capacitive oil level sensor provided to measure an oil level in said reservoir, said sensor comprising:

an L-shaped housing having a first leg at least partially immersed in said oil reservoir and a second leg disposed substantially perpendicular from said first leg and extending outside said drive axle housing substantially horizontally;

an L-shaped flat printed circuit board having a first leg disposed in said first leg of said sensor housing and a second leg disposed in said second leg of said sensor housing;

at least one first electrode plate fixed inside said first leg of said sensor housing;

at least one second electrode plate attached to said first leg of said printed circuit board opposite to said first electrode plate, wherein said first and second electrode plates forming a capacitor, a capacitance of said capacitor is a function of said level of said oil in which said capacitor is immersed;

a threaded mounting surface provided at said second leg of said sensor housing and suitable for threading said sensor into a threaded fill plughole in said drive axle housing;

a wrench engaging surface secured to said second leg of said sensor housing and adapted for mounting said sensor to said drive axle housing;

a thermistor for measuring an oil temperature in said oil reservoir, said thermistor mounted to said printed circuit board; and an electronic sensor circuitry electrically coupled to said oil level detecting capacitor and said thermistor, and adapted to generate an electric signal proportional to said oil level in said drive axle housing and an electric signal proportional to said oil temperature in said oil reservoir, wherein said electronic sensor circuitry is supported on said second leg of said printed circuit board.

26. A drive axle housing of a motor vehicle, said axle housing comprising:

an enlarged central portion housing a differential assembly, said central portion forming an oil reservoir containing a certain amount of lubricating oil;

a pair of opposite axle tubes extending from said central portion; and a capacitive oil level sensor mounted to said central portion of said drive axle housing and provided for measuring an oil level in said oil reservoir, wherein said capacitive oil level sensor includes a housing having a first leg at least partially immersed in said oil reservoir and a second leg extending from said first leg at an angle thereto, said first leg houses an oil level detecting capacitor at least partially is immersed in said oil reservoir to detect said oil level.

27. The drive axle housing as defined in claim 26, wherein said oil level detecting capacitor includes at least a pair of flat electrode plates.

28. The drive axle housing as defined in claim 26, wherein said oil level detecting capacitor includes at least a pair of tubular electrodes.

29. The drive axle housing as defined in claim 26, wherein said capacitive oil level sensor further comprising an oil temperature sensor for measuring an oil temperature in said oil reservoir, said oil temperature sensor disposed in said sensor housing.

30. The drive axle housing as defined in claim 26, wherein said capacitive oil level sensor further comprising an electronic sensor circuitry electrically coupled to said oil level detecting capacitor and adapted to generate an electric signal proportional to said level of said oil in said drive axle housing.

\* \* \* \* \*